(12) United States Patent
Johansson

(10) Patent No.: US 12,351,200 B2
(45) Date of Patent: Jul. 8, 2025

(54) METHOD AND CONTROL SYSTEM FOR LIMITING A DRIVER ACCELERATION REQUEST

(71) Applicant: Volvo Car Corporation, Gothenburg (SE)

(72) Inventor: Tommy Johansson, Mölndal (SE)

(73) Assignee: Volvo Car Corporation, Gothenburg (SE)

( * ) Notice: Subject to any disclaimer, the term of this patent is extended or adjusted under 35 U.S.C. 154(b) by 252 days.

(21) Appl. No.: 18/053,928

(22) Filed: Nov. 9, 2022

(65) Prior Publication Data

US 2023/0146809 A1    May 11, 2023

(30) Foreign Application Priority Data

Nov. 11, 2021 (EP) .................................. 21207788

(51) Int. Cl.
*B60W 50/00* (2006.01)
*B60W 40/06* (2012.01)
(Continued)

(52) U.S. Cl.
CPC ............ *B60W 50/12* (2013.01); *B60W 40/06* (2013.01); *B60W 40/09* (2013.01);
(Continued)

(58) Field of Classification Search
CPC ...... B60W 50/12; B60W 40/06; B60W 40/09; B60W 40/105; B60W 40/107;
(Continued)

(56) References Cited

U.S. PATENT DOCUMENTS

2005/0167175 A1* 8/2005 Isaji ..................... B60K 31/042
180/170
2009/0164082 A1* 6/2009 Kobayashi ......... B60K 31/0008
701/96
(Continued)

FOREIGN PATENT DOCUMENTS

EP   3741975 A1   11/2020
EP   3858694 A1   8/2021
(Continued)

OTHER PUBLICATIONS

Machine translation of JP-2005178691-A (Year: 2005).*
(Continued)

*Primary Examiner* — Anne Marie Antonucci
*Assistant Examiner* — Jordan T Smith
(74) *Attorney, Agent, or Firm* — Amin, Turocy & Watson, LLP

(57) ABSTRACT

There is provided a method and control system for limiting a driver acceleration request of a vehicle. The vehicle comprises a controller arrangement that receives a driver acceleration request and determines whether the driver acceleration request is below an acceleration threshold. If so, it initiates a limiting protocol and dependent on the distance between a preceding vehicle and the host vehicle limits the acceleration of the vehicle in comparison to the driver acceleration request. The invention further relates to a vehicle comprising such as control system.

15 Claims, 3 Drawing Sheets

(51) Int. Cl.
  *B60W 40/09* (2012.01)
  *B60W 40/105* (2012.01)
  *B60W 50/12* (2012.01)
(52) U.S. Cl.
  CPC ....... *B60W 40/105* (2013.01); *B60W 2540/10* (2013.01); *B60W 2554/80* (2020.02)
(58) Field of Classification Search
  CPC ......... B60W 2540/10; B60W 2554/80; B60W 30/09; B60W 30/18163; B60W 2540/103; B60W 2554/802; B60W 2720/106; B60W 30/146; B60W 50/087; B60W 2540/106
  See application file for complete search history.

(56) References Cited

U.S. PATENT DOCUMENTS

| | | | | |
|---|---|---|---|---|
| 2013/0138309 | A1* | 5/2013 | Kabe | F16H 61/66254 701/58 |
| 2018/0065644 | A1* | 3/2018 | Kim | B60R 21/013 |
| 2020/0207348 | A1* | 7/2020 | Sato | B60W 10/20 |
| 2020/0262446 | A1* | 8/2020 | Mayoshi | B60W 50/10 |
| 2020/0384995 | A1* | 12/2020 | Bang | B60W 50/0097 |
| 2020/0391734 | A1 | 12/2020 | Jung | |
| 2022/0266829 | A1* | 8/2022 | Thompson | B60W 50/087 |

FOREIGN PATENT DOCUMENTS

| | | | | |
|---|---|---|---|---|
| JP | 2005178691 A | * | 7/2005 | |
| WO | WO-2011133091 A1 | * | 10/2011 | A61B 5/18 |

OTHER PUBLICATIONS

Machine Translation of WO-2011133091-A1 (Year: 2011).*
Extended EP Search Report for EP Application No. 21207788.7 dated May 11, 2022.

* cited by examiner

METHOD AND CONTROL SYSTEM FOR LIMITING A DRIVER ACCELERATION REQUEST

CROSS-REFERENCE TO RELATED APPLICATIONS

This application claims the benefit of and priority to pending EP patent application serial number 21207788.7, filed Nov. 11, 2021 and entitled "METHOD AND CONTROL SYSTEM FOR LIMITING A DRIVER ACCELERATION REQUEST," the entirety of which is hereby incorporated by reference herein.

TECHNICAL FIELD

The present invention relates to a method for limiting a driver acceleration request, a control system for implementing the method in a vehicle and a vehicle comprising such a control system.

BACKGROUND ART

Many vehicles today are equipped with autonomous and/or at least partly automatic drive systems. Such systems generally aim at increasing comfort and/or safety for vehicle occupants. Some systems are also arranged to increase safety for persons in the host vehicle and/or in its surrounding.

An example of such a system is an adaptive cruise control system, hereinafter "ACC". The ACC may comprise one or more sensors such as a camera and/or a radar, which continuously monitors the host vehicle's surroundings. The ACC may also comprise or be connected to a drive control system which adjusts a velocity of the host vehicle in dependence to a preceding vehicle of the host vehicle as detected by the sensors. If the host vehicle approaches a preceding vehicle driving in the same lane, the ACC may adjust the selected velocity such that the host vehicle keeps a safe distance to the preceding vehicle and follows the preceding vehicle at a safe distance. Another type of ACC can for instance keep a selected host vehicle velocity where no vehicles are present in front of the host vehicle.

In addition or alternative to an ACC, vehicles may be equipped with passive driver assisting systems wherein one or more alarm systems are activated when a dangerous situation occurs or is about the occur. In contrast to an ACC, a passive driver assisting system does not take over functions from the driver and instead only warns the driver. For example, when a vehicle is unintentionally not keeping its lane, or when it closes in too much on a preceding vehicle, an alarm may sound to prompt the driver to take action.

Today a major cause for traffic accidents is so-called tail gating wherein drivers unintentionally get too close to the preceding vehicle. It would be desirable to improve on existing ACC systems and/or existing passive systems to reduce the amount of unintentional tail gating and thereby reduce the number of traffic accidents.

SUMMARY OF THE INVENTION

According to the present invention, there is provided a method for limiting a driver acceleration request. The method comprises receiving a driver acceleration request; determining whether the driver acceleration request is below an acceleration threshold; and initiating a limiting protocol if the driver acceleration request is below the acceleration threshold, wherein the limiting protocol includes: detecting a preceding vehicle of the host vehicle and obtaining sensor data associated with the distance of the host vehicle to the preceding vehicle; comparing the sensor data to a distance threshold for safe distance between vehicles; and outputting a vehicle acceleration order wherein acceleration of the vehicle is limited in comparison to the acceleration request if the sensor data is below the distance threshold.

In this context, the term "driver acceleration request" (DAR) is used to indicate both active requests, e.g., where the driver actively pushes down the accelerator pedal further, as well as passive requests, wherein the vehicle would accelerate without interference of the driver due to changing road conditions such as a different slope of the road or different wind conditions.

Advantageously, the method limits the acceleration of the vehicle when a moderate acceleration is unintentionally requested that would bring the vehicle to an unsafe position too close to a preceding vehicle. An active decision of the driver in the form of a more distinct acceleration request is required to disable the limiting protocol and obtain the vehicle acceleration as requested. Such a more distinct acceleration may for instance be requested by giving a more distinct push on the accelerator pedal or another type of throttle controller.

In an embodiment, the limiting protocol is disabled when the vehicle is changing lane or is about to change lane. It is advantageous to disable the acceleration limiting protocol when a vehicle changes lane or is about to change lane since this typically relates to a situation wherein the host vehicle is about to take over the preceding vehicle. In such a situation, tail gating is to some extent desired since the host vehicle preferably accelerates and approaches a preceding vehicle closer than a safe distance before carrying out manoeuvre of overtaking the preceding vehicle. It would be undesirable for the driver if the vehicle acceleration got limited while carrying out the manoeuvre.

For identification that the vehicle is changing lane or is about the change lane, the vehicle may for example be equipped with a camera and/or sensor that can monitor lane markings on the road and identify when the vehicle changes lane. Alternatively or in addition, the limiting protocol may be disabled when one of the vehicle's turn indicators is switched on, dependent on a position of the steering wheel, or dependent on a speed of rotating the steering wheel.

In an embodiment, the driver acceleration request is received after converting an accelerator pedal input into the driver acceleration request. The accelerator pedal input may for instance be measured by an accelerator pedal position sensor or derived from a pressure on the accelerator pedal. In this context the term "accelerator pedal" is used to indicate any type of throttle controller. It will be understood that also other types of throttle controllers may be provided, for instance a hand lever or a numerical input in a cruise control system of a vehicle to control a certain selected speed or request an increment in speed. The accelerator pedal or throttle controller enables the driver to at least partially control the speed and acceleration of the vehicle.

The conversion of the accelerator pedal input into a driver acceleration request takes place in a control unit. The conversion may typically be dependent on the driver and/or vehicle condition, such as the weight of the vehicle, an activated "eco" driving mode of the vehicle, the type of road, the slope of the road, the wind conditions, etc. The vehicle may be equipped with appropriate vehicle sensors and/or road sensors to collect data and use it in the conversion of the accelerator pedal input into the driver acceleration request. The driver acceleration request may be expressed in units of $[L]/[T]^2$, for example m/s$^2$.

In an embodiment, the acceleration threshold is a constant value. For example, the acceleration threshold may be 0.2 m/s$^2$, 0.5 m/s$^2$, or 1 m/s$^2$. The acceleration may be dependent on the characteristics of the vehicle, such as motor capacity or empty weight of the vehicle.

In an alternative embodiment, the acceleration threshold may be dependent on detected vehicle conditions and/or detected road conditions. Detected vehicle conditions may for instance include the current speed of the vehicle and/or the current weight of the vehicle. For example, the acceleration threshold may be larger at low speed of the host vehicle than at high speed of the host vehicle. This avoids that acceleration is unwantedly limited when moderately accelerating behind another vehicle when pulling up at a traffic light. Detected road conditions may include the road type, the road slope, traffic conditions, or a maximum speed limit that is in place on the road.

In an embodiment, the distance threshold is determined based on the current speed of the host vehicle. Typically, in safe driving campaigns a distance threshold is expressed in units of time rather than length. For example, "maintain a distance of at least 2 seconds". The distance threshold in the method can be defined in a similar way. It will be understood that any safe distance can be implemented and converted to units of length based on the current speed of the host vehicle. Optionally, the distance threshold is between 1 and 3 seconds. Alternatively, the distance threshold may be defined as a constant length.

In an embodiment, the distance threshold is determined based on a long term average driver behaviour. The vehicle may comprise a controller that is configured to learn and identify the typical distance to a preceding vehicle that is kept by the driver of the host vehicle. The controller may then, based on statistics kept on the distance, compute a driver specific distance threshold. Determination of the driver specific distance threshold may for example be done by analysing the statistics of earlier events where the vehicle approached a preceding vehicle and actively braked or relaxed the accelerator pedal to increase the distance between the host vehicle and the preceding vehicle. The driver specific distance threshold may be linked to the vehicle, or may be linked to a specific user, e.g., driver, of the vehicle. Driver identification may be performed by any suitable means, such as by personal car keys, camera with facial/body recognition within the passenger compartment, seat settings, or similar.

In an embodiment, the distance threshold may also be determined based on both the current speed of the host vehicle and a long term average driver behaviour. The long term average driver behaviour may be determined as the average distance from a preceding car when driving at a certain speed, and converted to a distance threshold based on the current speed of the host vehicle.

In an embodiment, the limiting protocol is disabled when the host vehicle moves at a speed below a speed threshold. The speed threshold may for instance be 20 km/h, 15 km/h, or 10 km/h. Advantageously, such a speed threshold avoids that a driver acceleration request is limited at very low speed. For example, when attempting to park the host vehicle closely behind a preceding vehicle, the system should not interfere and should allow the vehicle to also be accelerated at very limited amounts. Alternatively, the acceleration threshold may be adapted to allow small accelerations at low speed of the host vehicle.

In an embodiment, acceleration is limited to a constant value in the step of limiting the acceleration of the vehicle, preferably to zero. Such a limitation for example is convenient when a vehicle drives downhill. When a driver has the desire to keep driving at an approximately constant speed, and the driver is aware that he/she is driving downhill, the driver would normally partially or entirely release the accelerator pedal. Consequently, the vehicle would not accelerate but instead maintain an approximately constant speed. However, if the driver is not paying attention and keeps the accelerator pedal pushed, the vehicle would moderately accelerate. The limiting protocol can prohibit such acceleration if this would lead to the vehicle closing in too much on a preceding vehicle.

In an embodiment, the acceleration threshold is a first acceleration threshold and the method further comprises determining whether the driver acceleration request is below a second acceleration threshold, the second acceleration threshold being lower than the first acceleration threshold. The step of limiting the acceleration of the vehicle in comparison to the acceleration request if the sensor data is below the distance threshold includes limiting the acceleration of the vehicle to a first value if the acceleration request is between the first and second acceleration threshold; and limiting the acceleration of the vehicle to a second value if the acceleration request is below the second acceleration threshold, wherein the second value is lower than the first value. For example, the first value may be equal to the value of the second acceleration request and the second value may be equal to zero. It will be understood though that the first and second values may also be chosen differently.

Advantageously, a stepwise acceleration limiting of the vehicle acceleration is provided. This avoids very abrupt changes in acceleration when the limiting protocol is alternately activated and deactivated because the vehicle is driving at a distance approximately equal to the distance threshold. Continuously switching between a relatively high acceleration and not accelerating at all can be experienced as unpleasant and jerky behaviour by both the driver as well as by the drivers of other vehicles on the road. It will be understood that in an embodiment, the method can also comprise third, fourth, fifth etc. acceleration thresholds that can enable a further stepwise limitation of the acceleration.

In an embodiment, at the step of limiting the acceleration of the vehicle, acceleration is limited using a continuous mapping from the requested vehicle acceleration to the actual vehicle acceleration. For example, the driver acceleration request may be limited using a linear mapping or an exponential mapping. Advantageous to using such a continuous mapping is that no or less abrupt behaviour is experienced when a driver acceleration request fluctuates around the acceleration threshold value over time.

In an embodiment, the method may further comprise converting the vehicle acceleration order into a torque request and optionally transmitting the torque request to a power train of the vehicle.

According to a second aspect of the invention, and in accordance with the advantages as described herein above, there is provided a control system for sending a torque request to a powertrain of a vehicle. The system comprises a controller arrangement, an accelerator pedal operatively connected to the controller arrangement, and at least one object detection sensor arranged to detect and measure the distance to a preceding vehicle and operatively connected to the controller arrangement. The controller arrangement is configured to receive accelerator pedal input; convert the accelerator pedal input into a driver acceleration request;

compare the driver acceleration request to an acceleration threshold; and initiate an acceleration limiting protocol dependent on the result of the comparison. If the driver acceleration request is below the acceleration threshold, the controller arrangement is configured to limit the driver acceleration request to a vehicle acceleration order having a lower acceleration than the driver acceleration request when unsafe driving conditions are detected by the at least one object detection sensor. If the driver acceleration request is above the acceleration threshold, the vehicle acceleration order is set equal to the driver acceleration request. The controller arrangement is further configured to convert the vehicle acceleration order into a torque request; and transmit the torque request to the power train of the vehicle.

In an embodiment, the controller arrangement may consist of a single control unit. Optionally, the controller arrangement comprises more than one control unit, such as a first control unit and a second control unit. The first and second control unit may each have a processor and a memory unit. The first control unit may be provided as the vehicle dynamics controller of the vehicle.

The at least one object detection sensor can be one or more camera sensors, one or more radar sensors and/or one or more LIDAR-sensors. The sensors can be arranged at any position in or on the host vehicle from where detection of the preceding vehicle is possible. Some sensors may be arranged in or near a vehicle compartment, chassis, motor, drivetrain and/or the wheels. The sensor position may depend on the type of sensor used. For example, a camera sensor may be arranged at an inside of a windshield, while one or more radar sensors and/or a LIDAR sensor may be arranged in the grille and/or bumpers.

In an embodiment, the system further comprises a turn identification arrangement, wherein the control unit is configured to disable the limiting protocol when the turn identification arrangement signals that the host vehicle is changing lane or is about to change lane. The turn identification arrangement may for example comprise turn indicators, a steering wheel with steering angle sensor, and/or a lane recognition system.

In an embodiment, the control unit is configured to carry out a limiting protocol according to the invention.

According to yet another aspect of the invention and in accordance with the advantages as described herein above, there is provided a vehicle comprising a control system according to the invention, or configured to carry out the method according to the invention.

In an embodiment, the vehicle further comprises an adaptive cruise control system and/or one or more other automatic- or semi-automatic drive functions. Nowadays, modern cars are equipped with many different control systems. For example, the vehicle may further comprise lane departure warning and/or control systems, collision avoidance systems, auto-braking systems, traffic sign recognition systems, some communication systems, some navigation systems, inertial measuring systems, intelligent transportation systems, safe road train systems, automatic parking systems, etc. The acceleration limiting system may be just one of the many subsystems in the vehicle. Incorporating one or more of these systems enables an optimally comfortable and safe driving experience.

BRIEF DESCRIPTION OF THE DRAWINGS

The present invention will be discussed in more detail below, with reference to the attached drawings, in which.

DESCRIPTION OF EMBODIMENTS

Figure 1A:
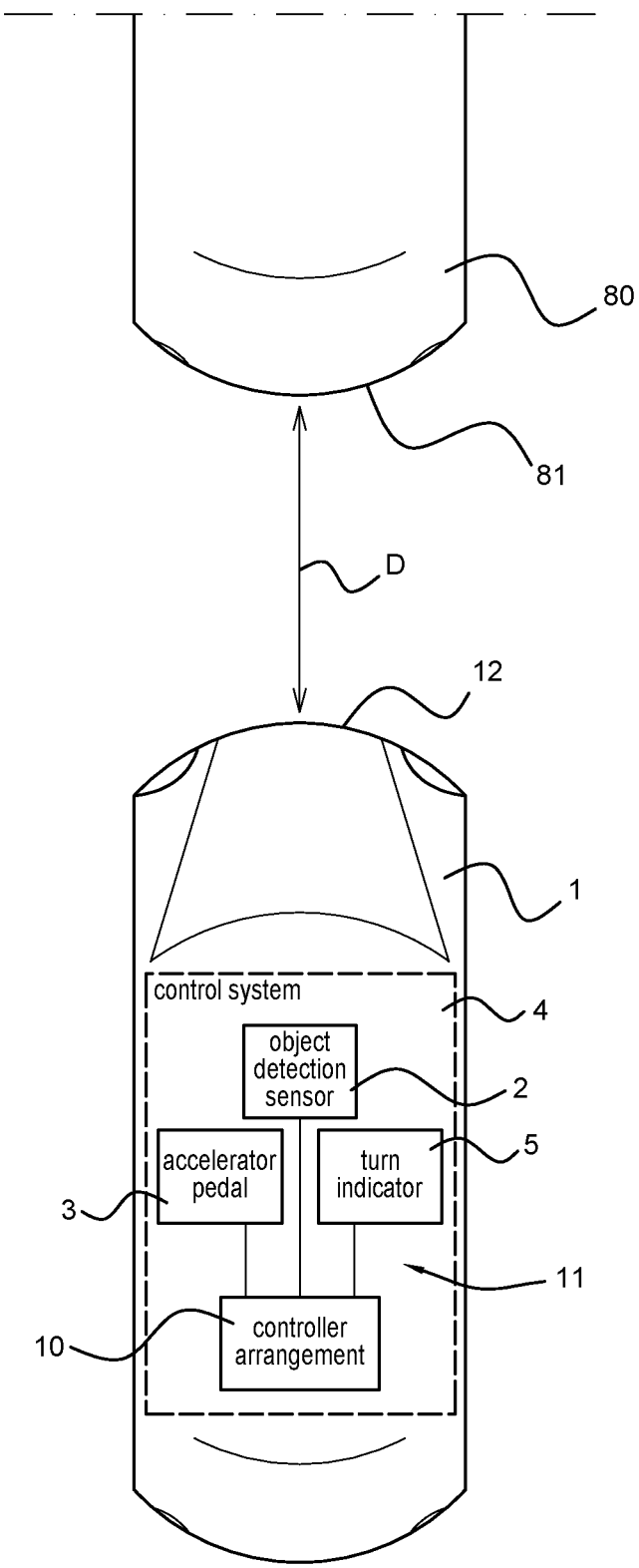
FIG. 1a depicts a schematic of a host vehicle having an acceleration limiting system according to a first embodiment of the invention in a traffic situation.

FIG. 1a schematically illustrates a host vehicle 1 having a control system 4 that can limit driver acceleration requests in a traffic situation. The host vehicle 1 is equipped with an object detection sensor 2, an accelerator pedal 3, one or more turn indicators 5, and a controller arrangement 10.

The object detection sensor 2 is incorporated into a camera at an inside of a windshield, arranged to detect a moving or stationary vehicle 80 in front of the host vehicle 1. The object detection sensor 2 can determine the distance D between a front side 12 of the host vehicle 1 and the rear side 81 of a preceding vehicle 80. The object detection sensor 2 and accelerator pedal 3 are operatively connected to the controller arrangement 10.

The one or more turn indicators 5 are part of a turn identification arrangement 11 that identifies when a vehicle is changing lane or is about to change lane. The driver can communicate his/her desire to change a lane or initiate a turn by activating the turn indicator 5. In embodiments, the turn identification arrangement 11 may in addition or alternatively comprise other turn identification means that for instance based on a sensor for measuring the angle of the steering wheel, rotation of the steering wheel, or sensors to sense road conditions such as road markings to recognize that a turn or lane switch has been initiated.

Figure 1B:
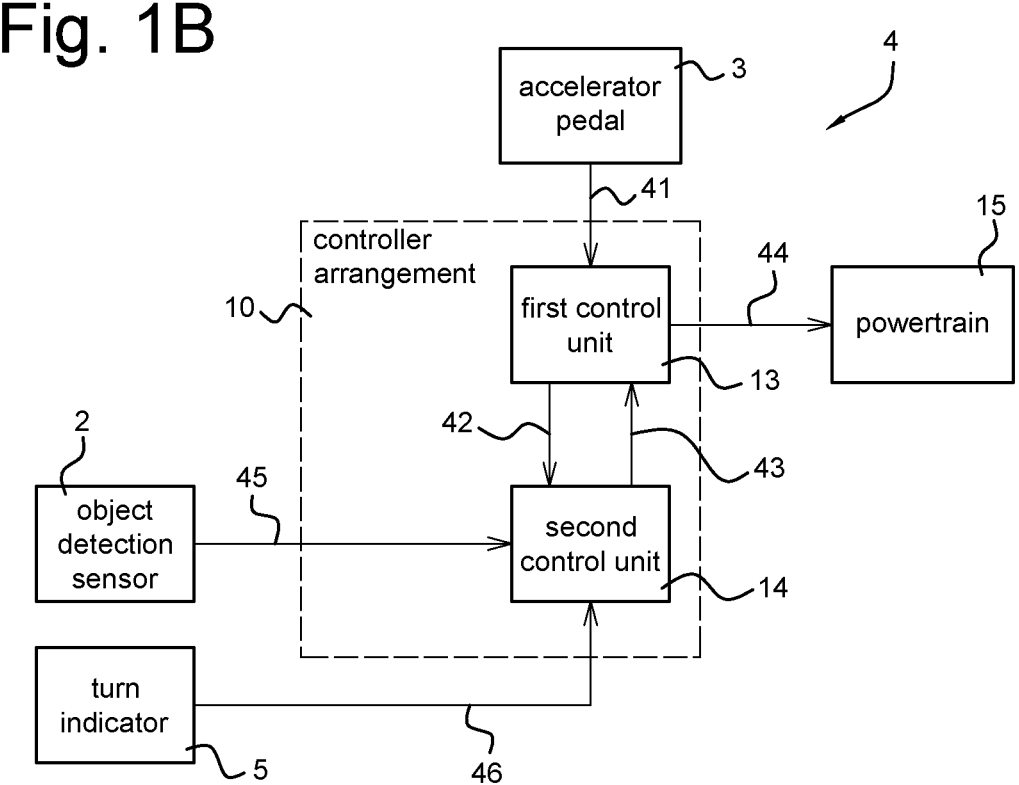
FIG. 1b depicts a system in the host vehicle of FIG. 1a that is configured to carry out a method for limiting a driver acceleration request.

FIG. 1b illustrates a flow diagram of the control system 4. The controller arrangement 10 comprises a first control unit 13 and a second control unit 14. It will be understood that the first control unit 13 and second control unit 14 can be provided as separate units, but that the first control unit 13 could also be programmed to take over the tasks of the second control unit 14 such that a separate control unit is not required. For explanatory purposes, however, it is most clear to illustrate an embodiment wherein two separate control units 13,14 are provided.

The first control unit 13 is typically associated with the vehicle dynamics. Several vehicle sensors that are configured to measure the vehicle conditions are operatively connected to the first control unit 13, such as for example sensors for the wheel speed, the steering wheel angle, the yaw velocity of the vehicle or the transverse acceleration of the vehicle. The first control unit 13 further receives input from the accelerator pedal 3. By pushing the accelerator pedal 3, a throttle request 41 is sent from the accelerator pedal 3 to the first control unit 13. In the present embodiment, the throttle request 41 is expressed as a percentage of pushing the accelerator pedal 3. Nevertheless, in alternative embodiments, the throttle request 41 could also be based on another input, such as the pressure measured on the accelerator pedal 3.

The first control unit 13 receives the throttle request 41 and converts it into a driver acceleration request 42 (DAR) in m/s². The first control unit 13 then determines whether a driver acceleration limiting protocol should be initiated or not. If the driver acceleration limiting protocol should be initiated, it sends the driver acceleration request (DAR) 42 to the second control unit 14. If not, it converts the DAR 42 into a torque request 44 having units of Nm.

The second control unit 14 receives the DAR 42, and runs a limiting protocol to calculate a vehicle output order (VAO) 43. The calculation of the limiting protocol is based on the sensor data 45 received from the object detection sensor 2 and/or turn indicator information 46 received from the turn indicators 5. The second control unit 14 transmits the VAO 43 in units of m/s² back to the first control unit 13, where it is converted into a torque request 44 in Nm. The torque request 44 is sent to the powertrain 15 of the vehicle 1. It will be understood that although in this embodiment the determination whether a driver acceleration limiting protocol should be initiated or not is carried out by the first control unit 13, the determination could also be performed by the second control unit 14 instead.

Figure 2:
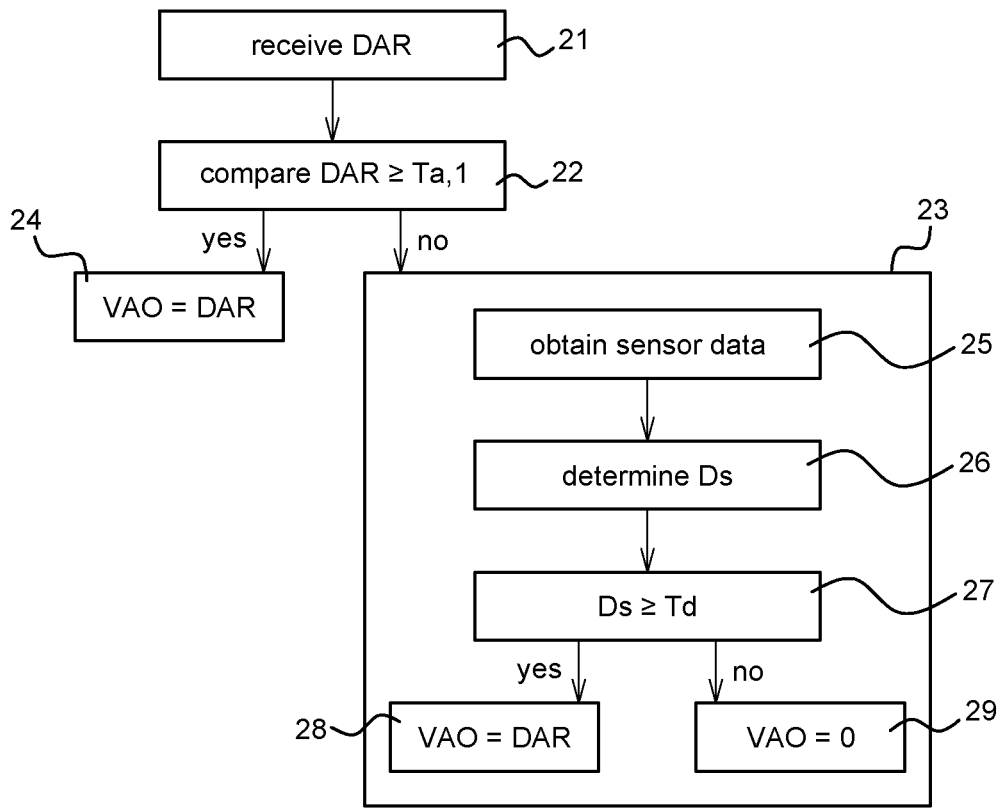
FIG. 2 shows a flow chart diagram that illustrates a first embodiment of a method for limiting a driver acceleration request.

FIG. 2 shows a flow chart diagram that illustrates a first embodiment of a method for limiting an incoming DAR 42 to a VAO 43. This method is carried out by the first control unit 13 and/or second control unit 14 of the controller arrangement 10.

The second control unit 14 regularly checks whether a DAR is received. For example, the controller 10 may check for the presence of a DAR every 0.01 second, every 0.1 second, or every second. After receiving the DAR (step 21), the second control unit 14 compares the DAR to an acceleration threshold $T_{a,1}$ (step 22) and initiates a limiting protocol 23 if the value of the DAR is lower than the acceleration threshold $T_{a,1}$. If the DAR exceeds the threshold $T_{a,1}$, the acceleration as requested is granted and the VAO is set equal to the DAR (step 24).

The threshold $T_{a,1}$ is designed to distinguish between the situation wherein a driver intentionally requests a vehicle acceleration, and wherein he/she does so unintentionally. If the acceleration request is strong, e.g., a large acceleration is requested by the driver, then it is assumed to be intentional. An intentional acceleration request should always be granted to enable safe and comfortable driving. Moreover, it allows the driver to quickly and intuitively take full control over the vehicle in case of an emergency wherein a strong acceleration could be required. However, if the request is moderate, e.g., a relatively small acceleration is requested, then it cannot be assumed that the driver wants to intentionally accelerate the vehicle. The DAR may for instance be the result of a moment of reduced awareness of the driver and/or due to changing external conditions such as the slope of the road or wind conditions. In case of a moderate DAR, e.g., a DAR with a low value, the DAR is only granted if safe driving conditions allow.

If the DAR does not exceed the acceleration threshold $T_{a,1}$, a limiting protocol 23 is initiated. According to the limiting protocol 23, one or more of the sensors 2 are used to detect the preceding vehicle 80 in front of the host vehicle 1 and obtain sensor data (step 25, 125) associated with the distance D of the host vehicle 1 to the preceding vehicle 80. The sensor data is converted by the controller 10 into a duration Ds, which is the duration it takes for the host vehicle to travel the distance D (step 26).

The duration Ds is compared to a distance threshold Td (step 27, 127). The distance threshold Td has a value of 1 second. If the duration Ds to reach the preceding vehicle 80 is larger than the distance threshold Td, the DAR is considered safe and granted (step 28). It will be understood, that alternatively the distance threshold may be converted to a distance having unit of length and step 27 could involve a comparison of the distance D to a threshold expressed in units of length.

The second control unit 14 provides a VAO equal to the DAR. On the contrary, if the duration Ds to reach the preceding vehicle 80 is smaller than the distance threshold Td the DAR is rejected. The vehicle 1 does not accelerate and the VAO equals 0 m/s2 (step 29, 129).

Figure 3:
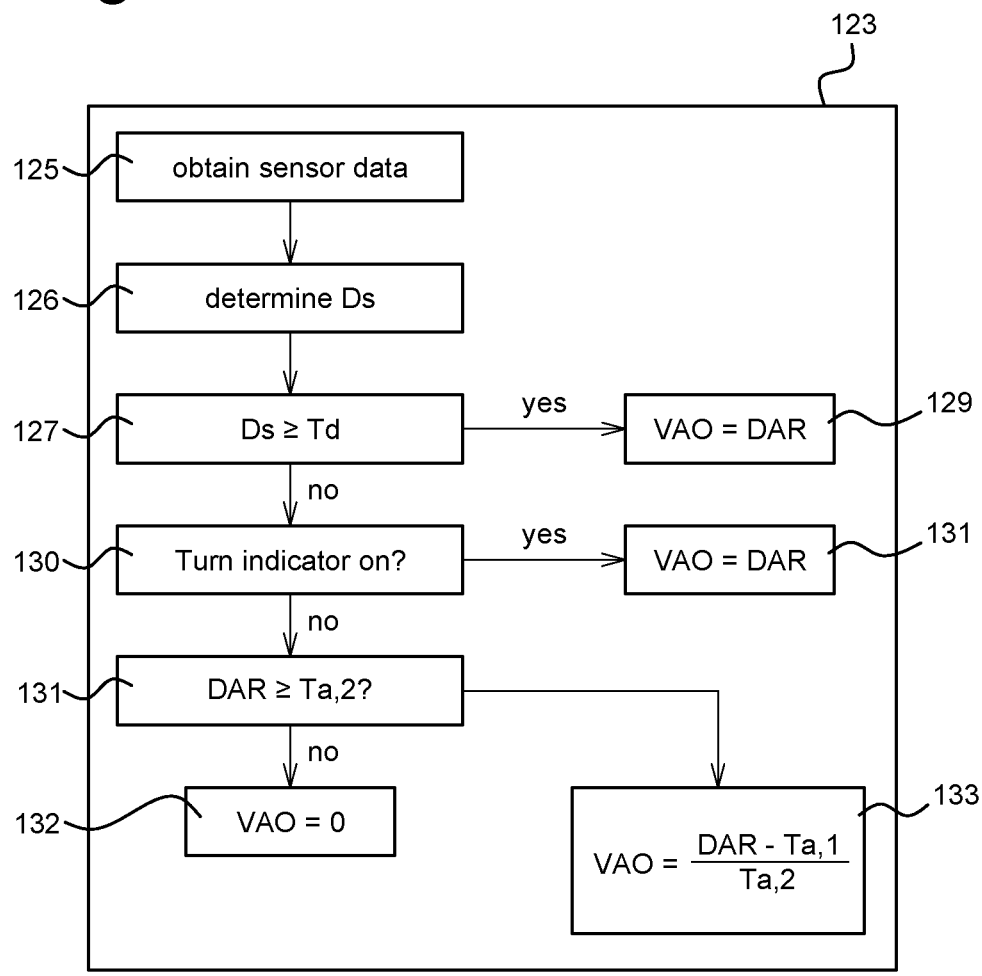
FIG. 3 shows a flow chart diagram of an alternative embodiment of a method for limiting a driver acceleration request.

FIG. 3 shows an alternative embodiment of a limiting protocol 123. The limiting protocol 123 could be used in the method depicted in the flowchart in FIG. 2.

Simultaneously, subsequently, or before comparing the duration $D_s$ to the distance threshold $T_{d,1}$, the second control unit 14 checks for an input of the turn identification arrangement 11 (step 130). If the second control unit 14 detects that the vehicle 1 is changing lane or is about to change lane, the limiting protocol 23 should be disabled or aborted. For example, if the turn indicator 5 is on, the driver is assumed to actively focus on driving and thus to have good awareness. Therefore when the vehicle is changing lane or is about to change lane, the DAR is automatically granted. The VAO equals the DAR (step 131).

If the distance to the preceding vehicle 80 is smaller than the distance threshold $T_d$, and the turn identification arrangement 11 gives no identification that a turn is being made or about to be made the limiting protocol 123 continues.

In the embodiment in FIG. 2, the DAR was limited to zero. However, this may not provide optimal driving comfort. To avoid that the host vehicle abruptly switches between an acceleration of zero and an acceleration according to the DAR, a stepwise limiting protocol may be implemented.

After the controller 10 has confirmed that a limiting of the DAR is required, the controller 10 may compare the DAR to a second acceleration threshold $T_{a,2}$ (step 131). This second acceleration threshold $T_{a,2}$ is lower than the first acceleration threshold $T_{a,1}$. If the DAR is lower than the second acceleration threshold $T_{a,2}$, the DAR is limited to zero and the vehicle 1 does not accelerate (step 132). Nevertheless, if the DAR is higher than the second acceleration threshold $T_{a,2}$, the acceleration is limited to the following value (step 133):

$$VAO = \frac{VAR - T_{a,1}}{T_{a,2}}$$

In an embodiment, the second acceleration threshold $T_{a,2}$ may be defined as half the value of the first acceleration threshold $T_{a,1}$, i.e., $T_{a,2}=T_{a,1}/2$. It will be understood, however that the thresholds may also be defined differently, for example $T_{a,2}=0.8*T_{a,1}$, or $T_{a,2}=0.9*T_{a,1}$.

It will further be understood that the DAR does not need to be limited all the way to zero in step 28 (FIG. 2) and step 132 (FIG. 3). Alternative values or functions to calculate the VAO may be present in other embodiments.

The invention must not be regarded as being limited to the preferred embodiments described above; a number of further variants and modifications are feasible without departing from the scope of the patent claims. An electrical machine configured according to the present invention may be used wherever a small and efficient electric machine is desired, for example, to control valves on a combustion engine.

The invention claimed is:

1. A method for limiting a driver acceleration request, the method comprising:
   receiving, by a processor of a vehicle, a driver acceleration request comprising a specified acceleration value;
   determining, by the processor, whether the specified acceleration value is below a first acceleration threshold; and
   initiating, by the processor, a stepwise acceleration limiting protocol in response to determining that the specified acceleration value is below the first acceleration threshold, wherein the stepwise acceleration limiting protocol comprises:
      detecting, by the processor, via a sensor, a preceding vehicle of the vehicle;
      obtaining, by the processor, via a sensor, sensor data indicating a distance between the vehicle and the preceding vehicle;
      comparing, by the processor, the distance to a distance threshold for safe distance between the vehicle and the preceding vehicle; and
      in response to determining that the distance is below a threshold distance:
         determining, by the processor, whether the specified acceleration value is below a second acceleration threshold that is lower than the first acceleration threshold,
         in response to determining that the specified acceleration value is not below the second acceleration threshold, executing, by the processor, a first vehicle acceleration order that controls a power train of the vehicle to limit acceleration of the vehicle to a first defined acceleration value that is below the specified acceleration value, and
         in response to determining that the specified acceleration value is below the second acceleration threshold, executing, by the processor, a second vehicle acceleration order that controls the power train of the vehicle to limit acceleration of the vehicle to a second defined acceleration value that is below the first defined acceleration value.

2. The method according to claim 1, further comprising disabling, by the processor, the stepwise acceleration limiting protocol in response to determining that the vehicle is changing lane or is about to change lane.

3. The method according to claim 1, wherein the driver acceleration request is received after converting an accelerator pedal input into the driver acceleration request.

4. The method according to claim 1, wherein the first acceleration threshold is a constant value.

5. The method according to claim 1, wherein the first acceleration threshold is dependent on at least one of detected vehicle conditions or detected road conditions.

6. The method according to claim 1, wherein the distance threshold is determined based on a current speed of the host vehicle.

7. The method according to claim 1, wherein the distance threshold is determined based on a long term average driver behaviour.

8. The method according to claim 1, further comprising disabling, by the processor, the stepwise acceleration limiting protocol in response to determining that the vehicle is moving at a speed below a speed threshold.

9. The method according to claim 1, wherein the second defined acceleration value is zero.

10. The method according to claim 1, wherein the first defined acceleration value is a constant value.

11. The method according to claim 1, wherein in the stepwise acceleration limiting protocol employs a continuous mapping from the driver acceleration request to an actual vehicle acceleration order.

12. A control system for sending a torque request to a powertrain of a vehicle, the system comprising:
   processor configured to:
      receive accelerator pedal input;
      convert the accelerator pedal input into a driver acceleration request comprising a specified acceleration value;
      determine whether the specified acceleration value is below a first acceleration threshold;
      initiate a stepwise acceleration limiting protocol in response to determining that the specified acceleration value is below the first acceleration threshold, wherein the stepwise acceleration limiting protocol comprises:
         determining whether an unsafe driving condition is detected via at least one object detection sensor of the vehicle, and
         in response to determining that an unsafe driving condition is detected:
            determine whether wherein, if the specified acceleration value is below a second acceleration threshold;
            in response to determining that the specified acceleration value is not below the second acceleration threshold, convert a first vehicle acceleration order into a torque request, wherein the first vehicle acceleration order limits acceleration of the vehicle to a first defined acceleration value that is below the specified acceleration value;
            in response to determining that the specified acceleration value is below the second acceleration threshold, convert a second vehicle acceleration order into the torque request, wherein the second vehicle acceleration order limits acceleration of the vehicle to a second defined acceleration value that is below the first defined acceleration value; and
         transmit the torque request to the power train of the vehicle.

13. The control system according to claim 12, wherein the processor is further configured to disable the stepwise acceleration limiting protocol in response to determining that the vehicle is changing lane or is about to change lane.

14. The control system according to claim 12, wherein the unsafe driving condition comprises a distance between the vehicle and a preceding vehicle being below a distance threshold.

15. A vehicle comprising:
   a control system for sending a torque request to a powertrain of a vehicle, the system comprising:
      processor configured to:
         receive accelerator pedal input;
         convert the accelerator pedal input into a driver acceleration request comprising a specified acceleration value;
         determine whether the specified acceleration value is below a first acceleration threshold;
         initiate a stepwise acceleration limiting protocol in response to determining that the specified acceleration value is below the first acceleration threshold, wherein the stepwise acceleration limiting protocol comprises:

determining whether an unsafe driving condition is detected via at least one object detection sensor of the vehicle, and in response to determining that an unsafe driving condition is detected:

determine whether the specified acceleration value is below a second acceleration threshold;

in response to determining that the specified acceleration value is not below the second acceleration threshold, convert a first vehicle acceleration order into a torque request, wherein the first vehicle acceleration order limits acceleration of the vehicle to a first defined acceleration value that is below the specified acceleration value;

in response to determining that the specified acceleration value is below the second acceleration threshold, convert a second vehicle acceleration order into the torque request, wherein the second vehicle acceleration order limits acceleration of the vehicle to a second defined acceleration value that is below the first defined acceleration value; and transmit the torque request to the power train of the vehicle.

* * * * *